United States Patent

Adams

[11] Patent Number: 5,328,198
[45] Date of Patent: Jul. 12, 1994

[54] FLUID AND TENSION BAND-OPERATED HITCH ADAPTOR

[76] Inventor: Andy B. Adams, 501 Bres St., Monroe, La. 71201

[21] Appl. No.: 817,317

[22] Filed: Jan. 6, 1992

Related U.S. Application Data

[63] Continuation-in-part of Ser. No. 698,284, May 10, 1991, abandoned, and a continuation-in-part of Ser. No. 691,995, Apr. 26, 1991, abandoned.

[51] Int. Cl.$^5$ .............................................. B62D 53/06
[52] U.S. Cl. .................................. 280/439; 280/440; 267/35; 267/73
[58] Field of Search ............... 280/415.1, 433, 438.1, 280/439, 440, 441, 483, 485, 715, 716; 267/73, 74, 153, 35

[56] References Cited

U.S. PATENT DOCUMENTS

| | | | |
|---|---|---|---|
| 3,253,840 | 5/1966 | Granning | 280/440 |
| 4,580,806 | 4/1986 | Kolstad et al. | 280/439 |
| 5,054,800 | 10/1991 | Christensen et al. | 280/716 |
| 5,171,036 | 12/1992 | Ross | 280/713 |

FOREIGN PATENT DOCUMENTS

| | | | |
|---|---|---|---|
| 0073689 | 9/1960 | France | 280/440 |
| 1324996 | 3/1963 | France | 280/440 |
| 1173598 | 12/1969 | United Kingdom | 280/440 |
| 2037684 | 7/1980 | United Kingdom | 280/438.1 |

*Primary Examiner*—Richard M. Camby
*Assistant Examiner*—A. M. Boehler
*Attorney, Agent, or Firm*—John M. Harrison

[57] ABSTRACT

A fluid and tension band-operated hitch adapter mounted in the bed of a pickup truck or similar towing vehicle for cushioning the fifth wheel, receiving pin or ball coupling element and dampening the resulting trailer load. In a preferred embodiment the fluid and tension band-operated hitch adapter is fitted with a fluid-operated bag, a tension band and fluid-operated cylinders and is attached to the vehicle bed by hinges, to cushion road shock.

8 Claims, 2 Drawing Sheets

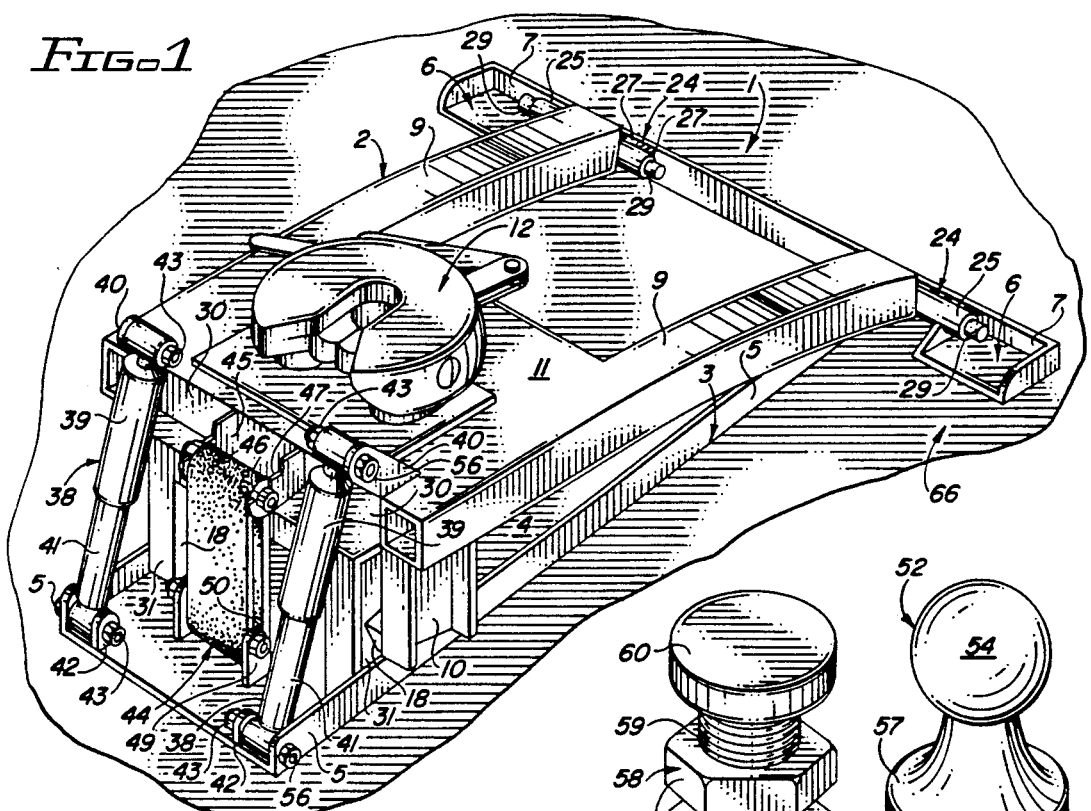
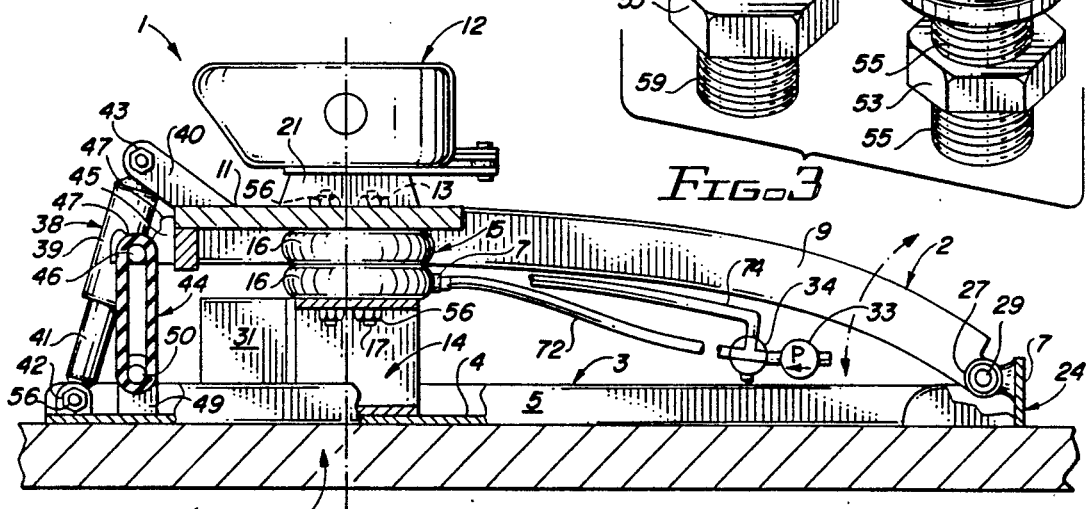
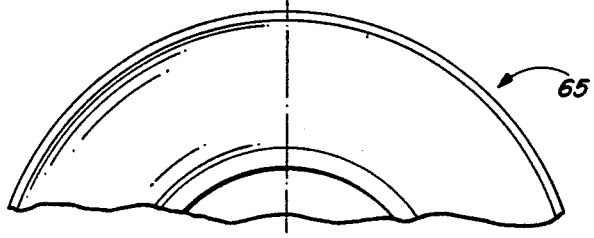

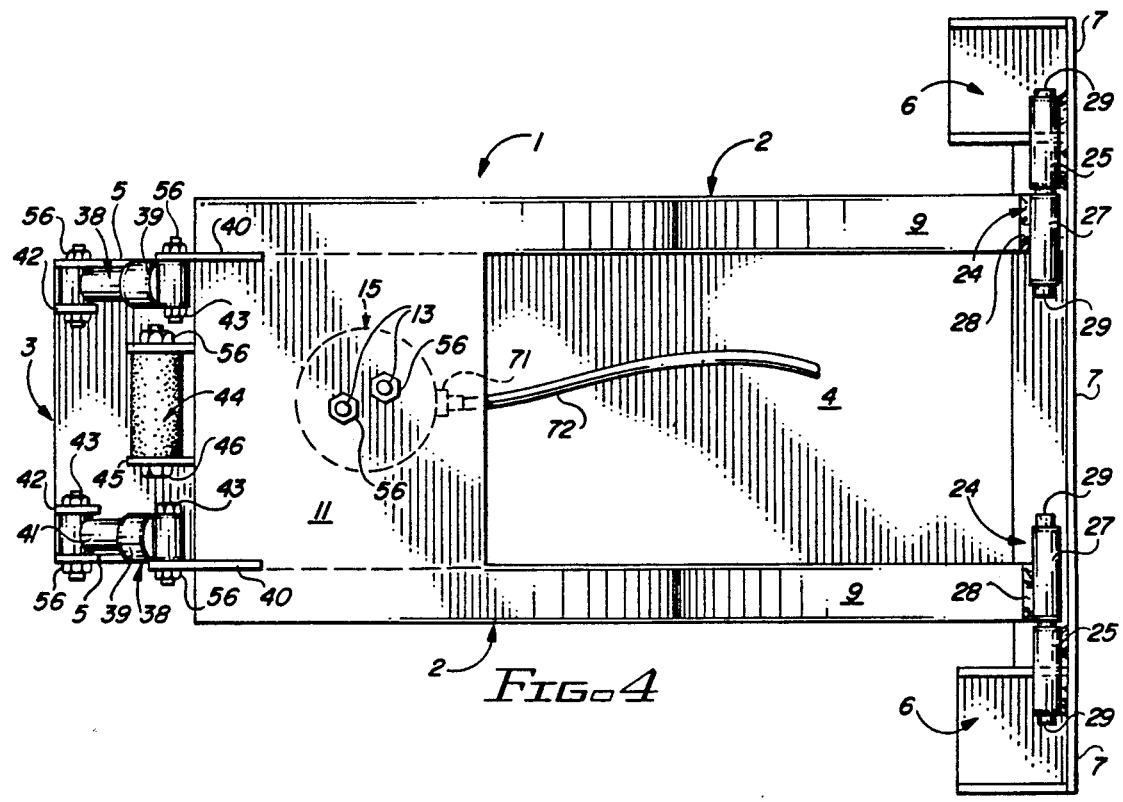
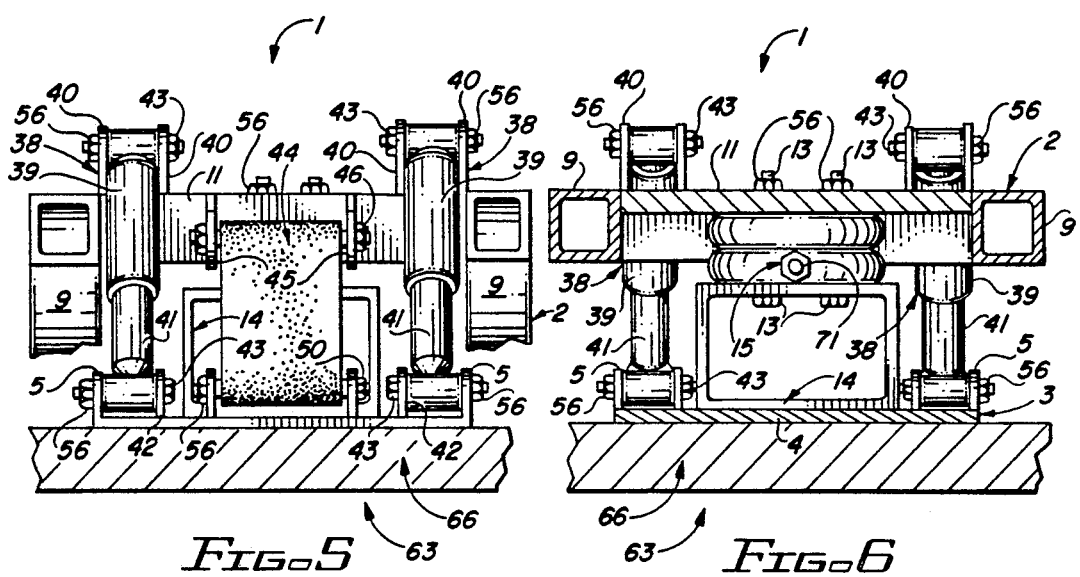

FLUID AND TENSION BAND-OPERATED HITCH ADAPTOR

CROSS-REFERENCE TO RELATED APPLICATIONS

This application is a continuation-in-part of my co-pending U.S. Pat. application Ser. No. 07/698,284, filed May 10, 1991, now abandoned and a continuation-on-part U.S. Pat. application Ser. No. 07/691,995, filed Apr. 26, 1991, now abandoned.

BACKGROUND OF THE INVENTION

1. Field of the Invention

This invention relates to hitch adapter systems for mounting in the bed of flatbed trucks, pickup trucks and similar vehicles and securing a trailer to the vehicle for towing purposes. More particularly, the invention relates to a combined fluid and tension band-operated hitch adapter which is designed to cushion the fifth wheel, receiving pin or ball coupling device without negatively affecting the center of gravity of the trailer load. More specifically, in a first preferred embodiment the fluid and tension band-operated hitch adapter is characterized by an adapter frame having curved support beams, one end of which are hinged to the bed of a towing vehicle such as a pickup truck and the other end welded to a hitch pedestal. The hitch pedestal is designed for mounting the fifth wheel, receiving pin or ball coupling element to facilitate optimum load distribution and clearance between the trailer and tile towing vehicle.

A primary problem recognized by truckers and others towing trailers of various description is road shock, which places great stress on the towing vehicle, hitch coupling and trailer, particularly at a time when many of the roads and highways in tile United States, including interstate highways, are in poor condition.

2. Description of the Prior Art

Various devices are known in the art for mounting in the bed of a pickup truck or similar towing vehicle and securing a trailer to tile vehicle in towing configuration. U.S. Pat. No. 3,164,399, dated Jan. 5, 1965, to M. J. Lugash details a "Hinged Semi-Trailer Coupling Unit". The unit includes a fifth wheel mounted on a frame which is positioned in the bed of a pickup truck, which frame is hinged longitudinally to facilitate folding the fifth wheel and upper frame members from the horizontal to the vertical configuration and clearing the bed of the pickup truck for cargo. U.S. Pat. No. 3,826,516, dated Jul. 30, 1974, to Charles A. Weber, details a "Fifth Wheel Mounting Structure" for connecting a trailer such as a recreational vehicle to a pickup truck. The structure includes a frame mounted on the truck bed, with a fifth wheel platform on the frame for receiving a fifth wheel pin extending downwardly from the forward end of the trailer. The frame is adjustable in height and in forward and rear positions in the bed to properly distribute the trailer weight on the wheels of the two vehicles and over tile rear axle of the truck. The frame may include two downwardly-extending, vertically positioned legs having an adjustment feature for varying the elevation of the fifth wheel. A "Slide Pull and Park Bar Hitch Structure" is detailed in U.S Pat. No. 4,327,934, dated May 4, 1982, to T. F. Karnes. The structure is designed for connecting a trailer vehicle to a pickup truck by mounting a fifth wheel platform in the bed of the pickup truck. The device includes a pair of vertical frames mounted alongside the pickup truck wheel wells. The frames include a forward and rearward sliding bar which receives a horizontal member, to which is attached the fifth wheel platform, The sliding bar enables the pickup truck and trailer to travel an additional ten inches for maneuvering into a parking location at a trailer park. U.S. Pat. No. 4,429,892, dated Feb. 7, 1984, to William H. Frampton, details a "Sliding Fifth Wheel". The sliding fifth wheel is designed for attachment to a tractor for selectively moving the fifth wheel assembly of the tractor and has two drive members which are affixed to the frame of the tractor at one end and to the fifth wheel platform at the other end. The drive members may be extended or contracted from the cab of the tractor to cause the fifth wheel platform to slide. A "Fifth-Wheel Assembly" is detailed in U.S. Pat. No. 4,614,355, dated Sept. 30, 1986, to Richard L. Koch. The assembly permits the relative positions of a tractor and an associated trailer to be adjusted and includes a switching mechanism which activates an alarm in the cab of the tractor when the fifth wheel reaches a desired position. This position is a trade-off between the rear axle weight and drive axle weight. The switching mechanism includes a switch mounted on the base plate of the fifth wheel assembly and the actuated arm of the switch i s extended by means of a coil spring which i s engaged and displaced by the coupling shoe of the fifth wheel assembly. U.S. Pat. No. 4,643,443, dated Feb. 17, 1987, to Marlin V. Husa, details a "Trailer Hitch Assembly and Method". The trailer hitch assembly is removable and designed for connecting a gooseneck trailer to a pickup truck and includes a base Frame having a ball hitch mounted thereon and adapted to mount in the floor of the pickup truck box, such that the frame straddles both wheel wells and positions the ball hitch over the rear axle of the pickup truck. Two pairs of pivotable, elongated members are attached·to the base frame in telescoping relationship to frictionally engage the lower surface of the upper horizontal side rail caps of the pickup truck box. Biasing between and toward each side pair of side rail engaging members is provided to secure the hitch assembly in the pickup truck bed by making a positive frictional engagement with the box side rails. Upon connection of the trailer to the hitch assembly, the weight and fore and aft pull of the trailer further secures the hitch assembly to the pickup truck box. The hitch assembly is attached to the pickup truck box without the necessity of drilling, bolting or welding.

It is an object of this invention to provide a new and improved shock-absorbing hitch adapter designed for hinged mounting in the bed of a pickup truck or similar vehicle, which hitch adapter includes a frame hinged to the vehicle bed or frame and fitted with at least two shock-absorbing devices for positioning the towing vehicle hitch mechanism at or forwardly of the center of gravity and rear axle of the towing vehicle and cushioning road shock.

Another object of this invention is to provide a fluid and tension band-operated hitch adapter fitted with a tension band or alternative rebound limiting device such as rubber, bungie cords, tension springs, or combinations of these, and at least one fluid-operated shock absorbing apparatus and hingedly mounted in the bed of a pickup truck or other "towing vehicle for positioning the fifth wheel, receiving pin or ball hitching mechanism at or forwardly of the rear axle of the vehicle and cushioning the load, without negatively affecting the center of gravity of the load being towed.

Still another object of this invention is to provide a new and improved fluid and tension band, shock-absorbing hitch adapter designed for hinged attachment to the bed of a pickup truck or other towing vehicle in pivoting, maximum travel relationship and positioning the fifth wheel, receiving pin or ball hitch coupler on a pivoting frame fitted with a tension band and one or more remotely controlled, fluid-operated shock absorbing devices to facilitate minimal road shock to the coupling mechanism, towing vehicle and the trailer being towed.

Yet another object of this invention is to provide a fluid and tension band, shock-absorbing hitch adapter which is characterized by a box-like adapter frame pivotally mounted on hinges in a towing vehicle such as a pickup truck and fitted with a compressor-filled air bag and at least one fluid-operated shock absorber, both connected to a remote controlled compressor and depressurizing system, as well as a tension band, wherein the adapter frame is cushioned for reducing road shock and resulting damage to the pickup truck or other towing vehicle and trailer and is capable of relaxed, as well as imposed travel.

A still further object of this invention is to provide a fluid and tension band-operated hitch adapter designed to removably and hingedly operate in the bed of a pickup truck or other towing vehicle with no steel-to-steel contact, the adapter frame of which is fitted with hinges on a front edge and receives a pair of rearwardly-extending, curved beams and a hitch pedestal for receiving and supporting a fifth wheel, receiving pin or ball coupling mechanism to connect a trailer to the adapter frame at a point at or forwardly of the rear axle and center of gravity of the adapter frame, and further including a tension band, a pair of shock absorbers and an air bag filled by means of a remote controlled, direct-current mechanically-operated compressor and controlled by a valve pressurizing and depressurizing system, for cushioning the adapter frame with respect to the bed or frame of the towing vehicle and reducing road shock during travel.

Another object of the invention is to provide a fluid and tension band-operated hitch adapter which utilizes high molecular weight polyethylene bushings and wear plates to eliminate steel-to-steel contact, for totally isolating the truck and trailer, the suspension travel of which hitch adapter is exaggerated by the cantilevered positioning of the coupler location.

SUMMARY OF THE INVENTION

These and other objects of the invention are provided in a fluid and tension band-operated hitch adapter which includes in a first preferred embodiment, an adapter frame fitted with a pair of curved, spaced beams and a hitch pedestal for receiving a fifth wheel hitch mechanism and coupling a trailer to the frame, the front of which frame is pivotally mounted by means of a pair of hinges in the bed of a towing vehicle such as a pickup truck over the rear axle and the opposite end of the frame fitted with a tension band as well as a remote pressure controlled air bag and a pair of air-operated cylinders connected to an air compressor and valve pressurizing and depressurizing system. In a preferred embodiment the adaptor is hinged to the pickup truck bed and the remote controlled shock-absorbing air bag and fluid-operated cylinders are secured between the frame of the hitch adapter and a channel plate bolted to the pickup truck bed, for cushioning road shock. The fluid and tension band-operated hitch adapter can be operated to dolly a trailer using air spring and gas shock-assisted suspensions enhanced by the addition of a tension band which acts as a graduated limiting strap to control rebound without compromising road travel.

BRIEF DESCRIPTION OF THE DRAWING

The invention will be better understood by reference to the accompanying drawings, wherein:

FIG. 1 is a perspective view of a preferred embodiment of the fluid and tension band-operated hitch adapter of this invention hingedly mounted in the bed of a towing vehicle;

FIG. 2 is a side view, partially in section, of the fluid and tension band-operated hitch adapter illustrated in FIG. 1;

FIG. 3 is a perspective view of alternative ball and pin coupling devices for use in the fluid and tension band-operated hitch adapter illustrated in FIGS. 1 and 2;

FIG. 4 is a top view of the fluid and tension band-operated hitch adapter illustrated in FIGS. 1-3;

FIG. 5 is a front view of the fluid and tension band-operated hitch adapter illustrated in FIGS. 1-4, with the fifth wheel coupling mechanism and certain other parts detailed in FIGS. 1-4 omitted for brevity; and FIG. 6 is a rear view of the fluid and tension band-operated hitch adapter illustrated in FIG. 5.

DESCRIPTION OF THE PREFERRED EMBODIMENTS

Referring initially to FIGS. 1-3 of the drawings, the fluid and tension band-operated hitch adapter of this invention is hereinafter referred to as a hitch adapter and is generally illustrated by reference numeral 1. The hitch adapter 1 includes a pivotally mounted adapter frame 2, oriented over a base channel 3, which base channel 3 is constructed of a flat channel plate 4 and spaced, parallel channel flanges 5, spanned by the channel 3. A hitch pedestal 11 spans and connects the rearwardly-extending ends of two spaced, parallel, curved support beams 9 and receives a conventional fifth wheel 12, above the base channel 3. It will be appreciated by those skilled in the art that the fifth wheel 12 may be replaced by a ball hitch 52, which includes a ball 54, fitted with a coupling flange 57 and a threaded coupling bolt 55 and secured in place by a coupling nut 53, as illustrated in FIG. 3. Alternatively, a receiving pin 58, having a threaded pin shank 59, terminated at the top by a pin head 60 and fitted with a pair of coupling nuts 53, may also be used as a hitch mechanism, as further illustrated in FIG. 3. Referring again to FIG. 2 of the drawings, mounting the adapter frame 2 of the hitch adapter 1 in the illustrated pivoting position with respect to the base channel 3 locates the fifth wheel 12 over or forwardly of the rear axle centerline 62 and the center of gravity of the pickup truck 63 and well forward of the tailgate (not illustrated), but facilitates a resultant coupling load at or near the rear axle center line 62, bisecting the rear wheels 65, when a trailer (not illustrated) is attached to the fifth wheel 12 by means of a conventional trailer-connecting mechanism (not illustrated) well known to those skilled in the art. Accordingly, the design of the hitch adapter 1 offers the advantage of positioning the coupling point of the trailer sufficiently rearwardly in the truck bed 66 of the pickup truck 63 to facilitate more efficient balancing of the load and convenient and safe turning of the pickup truck 63 without striking the rear end of the pickup truck 63 by the trailer. However, the resulting load of the trailer remains distributed at or near the rear axle center line 62, as further illustrated in FIG. 2, depending upon the location of the adapter frame 2 with respect to the rear axle center line 62. The adapter frame 2 is designed to pivotally mount on a hinge mount plate 6, having a plate support 7 and bolted to the truck bed 66 of the pickup truck 63. This pivoting function is facilitated by a pair of spaced mount hinges 24, as illustrated in FIGS. 1, 2 and 4. Each of the mount hinges 24 includes outboard pipe segments 25, attached to opposite ends of the hinge mount plate 6, and inboard pipe segments 27, secured to the ends of the support beams 9 by means of welds 28. A pair of hinge pins 29 connect the respective outboard pipe segments 25 and inboard pipe segments 27 in the mount hinges 24, to facilitate pivoting of the adapter frame 2 with respect to the hinge mount plate 6, which is bolted to the truck bed 66 using suitable mount bolts (not illustrated), which may be inserted in holes drilled in the truck bed 66 to receive nuts (not illustrated) tightened against the hinge mount plate 6.

Referring again to FIG. 3 of the drawings, in an alternative embodiment of the hitch adapter 1, either the receiving pin 58 or the ball hitch 52 may be mounted on the hitch pedestal 11 for receiving a cooperating hitch mechanism (not illustrated) located on a trailer (not illustrated). All other components are the same as the hitch adapter 1 illustrated in FIGS. 1 and 2-6.

Referring again to FIGS. 1 and 2-6 of the drawings, in a preferred embodiment of the hitch adapter 1, an air bag 15, typically having double bellows 16, is disposed between the hitch pedestal 11, which spans the support beams 9 and a bottom air bag support 14, which is welded to the base channel 3. The air bag 15 is secured to the hitch pedestal 11 by means of at least one top air bag bolt 13 and nut 56 and to the bottom air bag support 14, the latter of which is welded to the channel plate 4, by means of a bottom air bag bolt 17 and cooperating nut 56. Accordingly, it will be appreciated from a consideration of FIGS. 1 and 2 that the entire adapter frame 2, including the fifth wheel 12, may pivot on the mount hinges 24 with respect to the base channel 3 and truck bed 66 against the bias in the bellows 16 of the air bag 15, to cushion or dampen road shock experienced by the pickup truck 63 and trailer. Alternatively, a pair of fluid-operated shock absorbers 38 may be disposed between the support beams 9 and the bottom air bag support 14, as further illustrated in FIGS. 1 and 2, to accomplish the same purpose. Depending upon the magnitude of the load to be applied to the fifth wheel 12, the fluid-operated shock absorbers 38 may also be mounted in the hitch adapter 1, along with the air bag 15, as desired. Referring to FIG. 2 of the drawings, in a most preferred embodiment of the invention the fluid-operated shock absorbers 38 are located rearwardly of the air bag 15, with each cylinder piston 41 secured to the base channel 3 by means of a piston bracket 42 and a first set of bracket bolts 43, complete with nuts 56. Similarly, the cylinder 39 of each of the fluid-operated shock absorbers 38 is secured to the respective support beams 9 by means of a corresponding cylinder bracket 40 and a second set of bracket bolts 43 and nuts 56, as illustrated. Under extreme loading conditions, and in a most preferred embodiment of the invention, a tension band 44 is mounted on the hitch pedestal 11 by means of a top band bracket 45 and a top band bracket bolt 46, or a bolt and bushing combination, secured by a nut 56 and seated in one or more cradles 47. The opposite end of the tension band 44 is mounted on a bottom mount bracket 49, welded to the channel plate 4, by means of a bottom band bracket bolt 50, or a bolt and bushing combination, and companion nut 56. Thus, the tension band 44 supplements the fluid-operated shock absorbers 38 and air bag 15 in absorbing shock loads placed on the hitch adapter 1 by a trailer. In another preferred embodiment of the invention and referring again to FIG. 2 of the drawings, the fifth wheel 12 is mounted on the hitch pedestal 11 by means of a flat pedestal bracket 21, which may be either welded to the hitch pedestal 11 or bolted thereto by means of the top air bag bolts 13 and nut 56.

Referring again to FIGS. 1 and 2 of the drawings, in yet another preferred embodiment of the invention a pair of guide bars 31 are vertically disposed beneath tile hitch pedestal 11 and are welded or otherwise attached to the base channel 3, which is mounted on the truck bed 66, as illustrated in FIG. 2. The guide bars 31 are capped by a stop plate 30. Severe stressing of the adapter frame 2 can occur due to rough roads or when one of the wheels of the towing vehicle and/or trailer rolls off the road surface onto the shoulder or from the shoulder on to the ground beyond or in a hole, or particularly in a trailer jackknife, which places an unequal load on the adapter frame 2 and facilitates contact between the stop plate 30 and the hitch plate 11. Accordingly, as further illustrated in FIG. 1, the stop plate 30 extends from the guide bars 31 in alignment with the path of the hitch pedestal 11 and overhangs the vertical outside edges of the guide bars 31, to prevent the support beams 9 and hitch pedestal 11 from extending beyond a selected distance with respect to the base channel 3. This might happen under circumstances where the adapter frame 2 may be pivoted far upwardly on the respective hinge pins 29 with respect to the guide bars 31 and stop plate 30 such as, for example, when the towing vehicle descends a steep embankment or the wheels drop into a hole prior to the trailer wheels reaching the embankment or hole. Lateral displacement of the adapter frame 2 with respect to the guide bars 31 is prevented by the support beam guides 10, extending downwardly from Fixed attachment to the support beams 9, as illustrated in FIG. 1, while excessive upper travel by the adapter frame 2 is prevented by contact between the guide stops 18, welded on the support beam guides 10, and the overhang of the stop plates 30.

Referring again to FIG. 2, in a most preferred embodiment of the invention the air bag 15 is connected to a direct current compressor 33 by means of a primary air line 72, attached to the air bag 15 by means of an air line fitting 71 and fitted with a 3-way valve 34. Alternatively, under circumstances where the fluid-operated shock absorbers 38 are used in place of the air bag 15, the primary air line 72 may be connected to the fluid-operated shock absorbers 38. Still further in the alternative, if both an air bag 15 and one or more fluid-operated shock absorbers 38 are used together in the hitch adapter 1, a secondary air line 74 may be extended from the 3-way valve 34 and primary air line 72 and connected to the fluid-operated shock absorbers 38. While the most preferred mode of the invention includes apparatus for pressurizing and depressurizing the air bag 15 and/or the fluid-operated shock absorbers 38, it is understood that the air bag 15 and fluid-operated shock absorbers 38 may be designed for operation as closed system shock absorbing devices, independently of any such pressurizing and depressurizing apparatus, according to the knowledge of those skilled in the art.

It will be appreciated by those skilled in the art that the fluid and tension band-operated hitch adapter of this invention provides an additional convenient and effective mechanical expedient for cushioning road shock. It will be further appreciated that variations may be made in the design of the adapter frame 2 in terms of width, length and materials of construction, depending upon necessary strength requirements based on tile weight of the trailer being towed. It is Further understood that either the fifth wheel 12, receiving pin 58 or ball hitch coupling 52 may be utilized in both embodiments of the adapter frame 2, according to the knowledge of those skilled in the art based on the teachings of this invention, to accommodate a trailer of substantially any coupling design, including "gooseneck" trailers, in non-exclusive particular, as well as configurations where a ball is provided on the trailer and a socket on the mount, such as pindle hitches and the like. It is also understood that a coil or leaf spring or other load-dampening, shock absorbing or suspension combinations and the like may be used in place of the air bag and/or fluid-operated shock absorbers 38, or in combination with these devices, as desired, in the hitch adapter 1. The air bag component may be typically characterized by a Firestone Industrial Products Co. "AIRSTROKE" actuator which operates as an "air spring", or equivalent device, while the tension band element is typically a "MARSH MELLOW SPRINGS" product also marketed by Firestone. Other devices which may also be used in place of the tension band element to aid in controlling suspension rebound are bungie cords or straps, live rubber or neoprene cord devices, steel springs or any combination of these devices, in non-exclusive particular, which exhibit graduated rebound control and memory. Furthermore, appropriate valving, controls, compressor design and instrumentation can be provided for separate remote control operation of the air bag 15 and the fluid-operated shock absorbers 38 of the invention, as desired. Moreover, in addition to operation by air, the fluid-operated shock absorbers 38 may by operated by gas, hydraulic fluid or oil, further according to the knowledge of those skilled in the art.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A fluid and tension band-operated hitch adapter for removably coupling a trailer to a towing vehicle, comprising plate means fixedly mounted on the towing vehicle; a frame hingedly mounted on said plate means; and air bag mounted between said frame and said plate means; at least one first shock absorber mounted on said frame and said plate means rearwardly of said air bag; a tension band mounted on said frame and said plate means rearwardly of said air bag; and hitch means carried by said frame for receiving the trailer and absorbing the coupling load of the trailer and said frame, whereby said air bag, said shock absorber and said tension band operate in concert to cushion the road shock of the towing vehicle and the trailer responsive to pivoting of said frame with respect to said plate means and the towing vehicle.

2. The fluid and tension band-operated hitch adapter of claim 1 wherein said plate means further comprises a base channel and said hitch means further comprises a fifth wheel.

3. The fluid and tension band-operated hitch adapter of claim 1 further comprising compressor means and pressure-regulating means connected at least to said air bag, whereby a gas can be selectively introduced into said air bag and bled from said air bag to adjust the shock-absorbing capability of said air bag.

4. The fluid and tension band-operated hitch adapter of claim 3 wherein said hitch means further comprises a ball hitch.

5. The fluid and tension band-operated hitch adapter of claim 3 wherein said hitch means further comprises a receiving pin.

6. The fluid and tension band-operated hitch adapter of claim 3 wherein said at least one shock absorber further comprises a pair of fluid-operated shock absorbers, said compressor means further comprises a direct-current compressor and said pressure-regulating means further comprises a valve connected to said compressor, said air bag and said fluid-operated shock absorbers.

7. A fluid and tension band-operated hitch adaptor for removably coupling a trailer to the bed of a pickup truck, comprising a firm hingedly mounted at one end in the pickup truck, said frame positioned substantially above the rear axle of the pickup truck; a pair of support beams carried by said frame and projecting rearwardly of said frame and the rear axle away from said one end; a base channel disposed beneath said frame and fixedly mounted to the bed of the pickup truck; an air bag disposed between said frame and said base channel, a pair of fluid-operated shock absorbers attached to said frame and said base channel; at least two tension band mount cradles carried by said frame; and a tension band disposed between a selected one of said mount cradles and said base channel in shock-absorbing relationship; and a firth wheel carried by said support beams for coupling the trailer to the pickup truck, whereby said air bag, said fluid-operated shock absorbers and said tension band operate in concert to cushion the road shock of the towing vehicle and the trailer responsive to pivoting of said frame and said support beams with respect to the towing vehicle.

8. The fluid and tension band-operated hitch adapter of claim 7 further comprising a pressure line extending from said air bag and said fluid-operated shock absorbers to the cab of the pick-up truck, a valve provided in said pressure line for selectively bleeding gas from said air bag and said fluid-operated shock absorbers and a compressor communicating with said pressure line for selectively charging said air bag and said fluid-operated shock absorbers with gas responsive to operation of said compressor and releasing gas from said fluid-operated shock absorbers and said air bag responsive to operation of said valve.

* * * * *